May 21, 1963    G. A. GUTEKUNST ETAL    3,090,507
ADJUSTABLE CONVEYOR MOUNTING FOR STORAGE STRUCTURES
Filed Nov. 1, 1960    2 Sheets-Sheet 1

INVENTORS.
Gerald A. Gutekunst
Kenneth L. Jensen
BY
ATTORNEY.

INVENTORS.
Gerald A. Gutekunst
Kenneth L. Jensen
BY
ATTORNEY.

United States Patent Office 3,090,507
Patented May 21, 1963

3,090,507
ADJUSTABLE CONVEYOR MOUNTING FOR STORAGE STRUCTURES
Gerald A. Gutekunst, Independence, and Kenneth L. Jensen, Kansas City, Mo., assignors to Butler Manufacturing Company, a corporation of Missouri
Filed Nov. 1, 1960, Ser. No. 66,602
7 Claims. (Cl. 214—17)

This invention relates generally to storage tanks having discharge hoppers and refers more particularly to tanks of this type equipped with means for withdrawing and conveying materials laterally or in a sidewise direction from the hopper.

One of the principal objects of the invention is to provide structure wherein a materials conveyor is so connected with the hopper as to permit wide variation in the angle of the conveyor with the hopper while still obtaining efficient withdrawal of material from the hopper. The invention has particular advantage in connection with hoppers in which it is desired to provide a material take-off from an inclined wall of the hopper.

Another important object of the invention is to provide an arrangement which permits use of a lateral conveyor in connection with the hopper without interfering with the discharge from the bottom of the hopper, if desired.

Still another object of the invention is to provide a hopper and conveyor mounting structure therefor which achieves the desired flexibility in angular positioning of the conveyor without reducing to any substantial degree the over-all strength of the hopper.

Yet another object of the invention is to provide a storage structure having a hopper bottom and in which the hopper bottom is provided with a lateral discharge conveyor which is so mounted to the hopper as to permit variation in the elevation of the conveyor without opening any paths for leakage of stored material.

A further object of the invention is to provide a lateral conveyor which is so mounted relative the hopper and constructed as to act in a fashion to prevent bridging of material in the storage structure and thus promote continuous flow of material from the structure.

Other and further objects of the invention together with the features of novelty appurtenant thereto will appear in the course of the following description.

In the accompanying drawings which are to be read in conjunction with the specification and form a part thereof, and in which like reference numerals indicate like parts in the various views.

Figure 1:
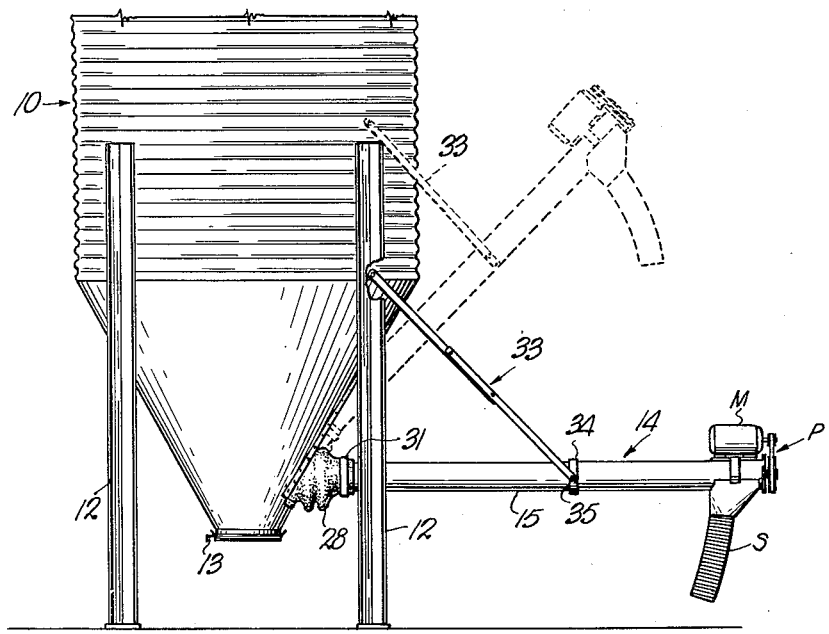
FIG. 1 is a side elevation of a typical storage tank equipped with a preferred embodiment of the invention.

Referring to the drawings, reference numeral 10 indicates generally a conventional elevated storage tank or structure which terminates at its lower end in the funnel-like hopper having the conical side wall 11. The storage structure in this case is cylindrical, being formed of corrugated metal sections bolted or suitably joined with one another and is supported on standards 12 which are secured in any suitable fashion to the main body. The lower end of the hopper is fitted with a slide valve 13 which controls a bottom discharge opening (not shown) and which can be manipulated as desired to control gravity discharge from the hopper through such opening.

Figure 3:
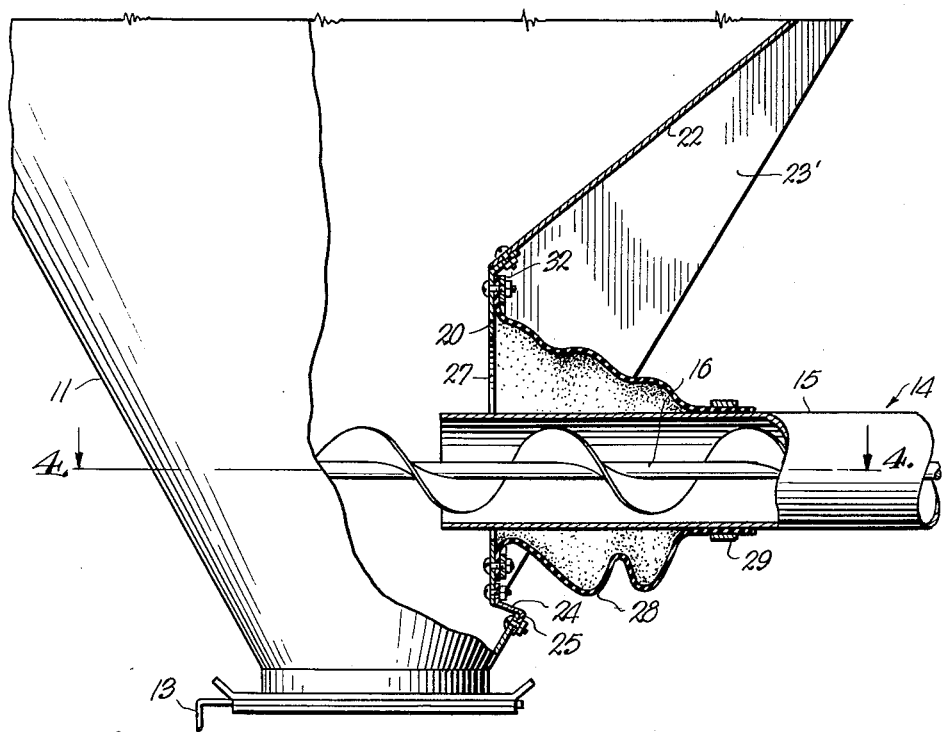
FIG. 3 is an enlarged side elevation of the lower portion of the hopper, part of the hopper being broken away and the adapter housing base plate, flexible sleeve and portions of the conveyor being shown in central vertical section.
Figure 4:
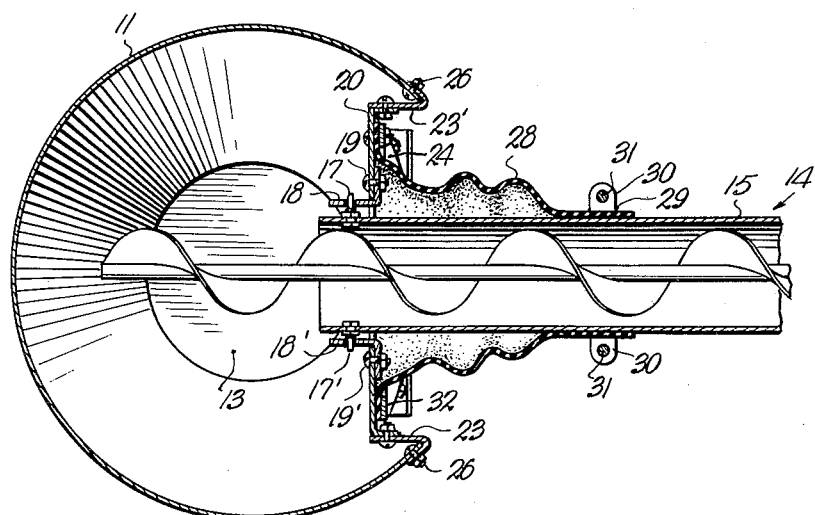
FIG. 4 is a sectional view taken generally along line 4—4 of FIG. 3 in the direction of the arrows.

Supported by and extending outwardly from the hopper is a materials conveyor 14 which, in this instance, comprises a screw conveyor having the tube 15 and internal auger 16 (see FIGS. 3 and 4). The outer end of the conveyor has mounted thereon the motor M which is connected through suitable sheaves and pulleys P with the shaft of the auger 16 in order to drive same. A discharge spout S for directing discharge from the outer end of the conveyor may also be provided.

The conveyor 14 is mounted to the hopper 11 in such fashion that it is capable of being swung through an arc of approximately 45° from the substantial level position illustrated in solid lines in FIG. 1 to the broken line position of the same figure. The inner end of the conveyor tube 15 extends into the hopper with the auger 16 projecting therefrom in order to pick up material within the hopper. The pivot axis for the conveyor is defined by a pair of oppositely extending trunnion pins 17 and 17' which are secured respectively in co-axial alignment with each other to the conveyor tube. These trunnions are journaled respectively in corresponding apertures provided in clips 18 and 18' which in turn are secured by bolts 19 and 19' to an adapter plate 20, subsequently to be described in greater detail.

It will be observed from FIGS. 3 and 4 that the inner end portion of the auger is unsupported by any guide bearings, being guided loosely within the tube 15. When the auger flights are moving material, the material itself provides sufficient support as to maintain the auger axis in a substantially fixed position. However, should the auger be starved by failure of material to flow onto the exposed flights, the auger commences to vibrate rather markedly, thus whipping the exposed end laterally. This whipping action of the auger tends to strike and agitate the bridged mass, thus to break up the bridging and restore settling into the auger zone.

Figure 2:
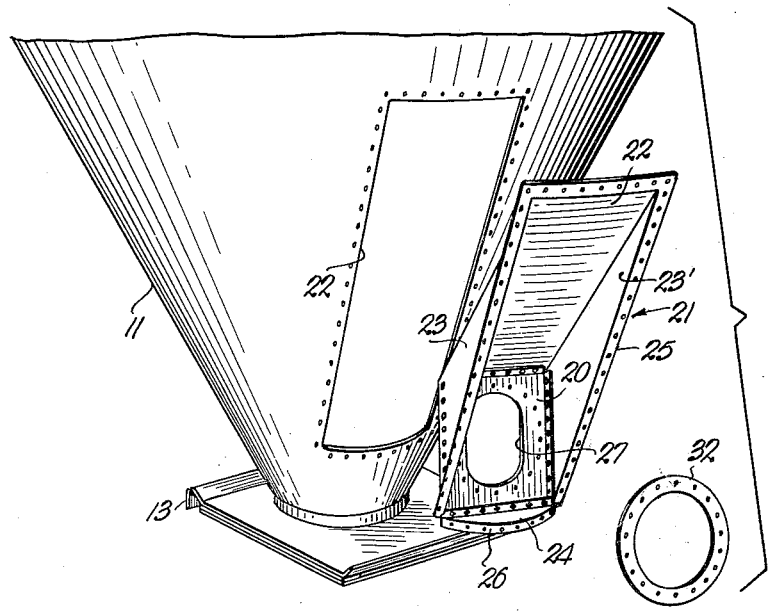
FIG. 2 is an enlarged perspective view of the bottom portion of the hopper showing the adapter housing and sleeve anchor in exploded relationship with the hopper.

As may best be seen in FIG. 2, the adapter plate 20 forms a part of a somewhat trough-like housing 21 which is adapted to be inserted into and to be secured around the edges of an elongate, generally rectangular opening 22 formed in the inclined side wall 11 of the hopper. The housing 21 is provided with the inwardly inclined base portion 22 which joins with the upper edge of the base plate 20. The sides of the trough are defined by the generally triangularly shaped side walls 23 and 23'. The base plate 20, which actually forms a continuation of the base of the trough, may for convenience in construction and assembly be formed separately and secured to the housing 21 through riveting, bolting or otherwise. Below the base plate 20 there is provided an outwardly extending transition piece 24 whose outer edge is adapted to conform with the lower edge of the opening 22.

For ease in construction and assembly the housing 21 is provided with the marginal flange 25 extending lengthwise of the sides 23 and 23' and across the upper end. The flange 25 is, of course, bent to conform with the curvature of the hopper and is secured to the hopper wall around the opening 22 through the medium of bolts or rivets, typical ones of which are seen at 26 in FIG. 4. To obtain a weathertight seal it is desirable that suitable washers be used on the bolts as well as a caulking compound between the adjoining surfaces of the housing flange 25 and hopper wall. The downturned flange 26 is provided on the outer edge of transition portion 24 and this is connected with the hopper in the same fashion as the flange 25.

From the foregoing it will be evident that the housing 21, when secured in place on the hopper, provides a trough-like cavity in the side of the hopper adapted to accommodate the conveyor 14 in the most elevated position of the latter. The inner end of the conveyor extends into the interior of the hopper through an aperture 27 formed in the base plate 20. The aperture 27 is, of course, oversized with respect to the outside diameter of the conveyor tube 15 and is elongated slightly in the vertical direction in order to accommodate the angular movement of the conveyor.

To prevent the escape of material from the hopper through the conveyor opening 27 there is provided the flexible sleeve or duct 28 which may be constructed of any suitable material such as reinforced canvas, nylon or other fabric coated with a waterproofing substance such as neoprene. The sleeve 28 surrounds the conveyor tube 15 and has one end secured firmly to and sealed around the tube 15 by a clamping collar 29 having the ears 30 and suitable clamping bolts 31. The other end of sleeve 28 is anchored to the surface of the base plate 20 by means of a ring-like anchor collar 32 bolted or otherwise firmly secured to plate 20 with the end of the sleeve therebetween. It will be evident that the length of the sleeve 28 should be such as to permit free movement of the conveyor between its upper and lower limiting positions without placing undue stress upon the sleeve.

To support the conveyor 14 at the elevation which is desired, suitable stays 33 connected respectively with the storage structure and the conveyor are provided. The conveyor end of stays 33 are secured to the conveyor by any suitable mounting such as the collar 34 and pivot pin 35. The other ends of the stays can be connected in any suitable fashion with the storage structure 10 (as shown in FIG. 1). If desired, the stays 32 can be made telescopically adjustable to eliminate the necessity of changing the location of the upper end of the stay for short distances of upward movement. In the extreme upper position to obtain the necessary support strength the upper end of the stays should be shifted to an upper position as shown in broken lines.

As will be evident, the housing 21 serves generally as a shroud surrounding the conveyor in its upper positions. By virtue of the arrangement employed the pivot axis for the conveyor can be located fairly closely to the center of the hopper, which thereby permits movement of the conveyor through a relatively large arc with a minimum vertical displacement of the inner end of the auger 16. This in turn permits the conveyor to be located as closely as possible to the lower end of the hopper, thus assuring of optimum clean-out during operation. Furthermore, the housing 21 provides the structural strength necessary for supporting the inner end of the conveyor on the hopper and eliminates the need for separate auger mounting brackets and reinforcement of the hopper wall.

The shape of the housing 21, which projects much like a blister on the inside wall of the hopper, is such that there is little tendency for storage materials to collect and bridge in the hopper. The inclined surface presented by the base 22 is the only surface operating to retard downward movement of material in the hopper and the incline of the surface is sufficient as to promote gravity movement of material therealong. The plate 20 and side walls 23 and 23' of the housing are all disposed in vertical planes and thus afford no interference to downward movement.

Moreover, it will be observed that through the arrangement provided it is possible to alternatively discharge from the bottom of the hopper without interference. By simply opening the slide valve 13, material can be delivered through the bottom of the hopper.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. Structure for mounting a conveyor tube to the inclined side wall of a storage tank hopper and permitting extended angular movement of the conveyor tube relative to said side wall with one end of the tube within the hopper, comprising a vertical conveyor mounting plate having side, top and bottom edges and disposed internally of the hopper and having a vertically elongated aperture therein through which the conveyor tube extends, the conveyor tube terminating at one end inwardly of the plate, means pivoting said conveyor tube to said plate for movement about a horizontal axis, said hopper wall having a vertically elongated opening through which the conveyor tube extends and having upper and lower edges and side edges spaced sufficiently to permit movement of the conveyor tube therebetween between the limits of angular movement, combined shroud and plate support means secured to said side wall and extending inwardly therefrom and connecting the edges of said opening with the corresponding edges of said mounting plate, said means forming a blister-like projection on the inside of said hopper side wall, and a flexible sleeve having one end surrounding a portion of and sealed to the exterior of said conveyor tube and the other end sealing around the aperture end of said mounting plate.

2. A structure for mounting a conveyor tube to the inclined side wall of a storage tank hopper and permitting extended angular movement of the conveyor relative to said side wall with one end of the tube within the hopper, comprising a housing forming a part of said side wall and providing therewith a trough-like cavity in the side wall having a base spaced inwardly of the hopper from said side wall, said base being provided with an oversized aperture through which the conveyor tube extends, means pivoting the tube to said base whereby to permit angular adjustment of the tube relative said hopper side wall between the side walls of said trough-like cavity, and flexible means forming a seal between the exterior of said tube and the edges of said opening.

3. Structure as in claim 2 wherein said base comprises a portion inclined inwardly from its upper edge at a greater angle than the hopper side wall and a vertical portion at the lower end and forming a continuation of the inclined portion, said aperture being formed in said vertical portion.

4. Structure as in claim 2 wherein said flexible means comprises a flexible sleeve surrounding a portion of and sealed at one end to the exterior of said tube and at the other end to said vertical portion around said aperture.

5. In a storage tank having a draw-off hopper provided with a side wall inclined from the vertical, the combination therewith of a conveyor tube extending into the hopper through a vertically elongated opening in the side wall and having one end disposed within the hopper, a trough of U cross section secured in said opening with the base of the trough spaced inwardly of the side wall and the legs connected respectively with the side edges of the opening and the respective ends of the trough connected with the upper and lower ends of the opening, said tube extending through an oversized aperture in said base, means pivotally supporting said tube for movement in a plane substantially normal to said base and about an axis adjacent said aperture whereby to permit angular adjustment of the tube relative said side wall, and flexible means forming a seal between the exterior of said tube in the edges of said aperture.

6. The combination as in claim 5 wherein the depth of said trough increases from the upper end toward the lower end.

7. The combination as in claim 6 wherein said trough is formed as a separate housing having marginal flanges overlapping and secured to said side wall around said opening.

References Cited in the file of this patent
UNITED STATES PATENTS

| | | |
|---|---|---|
| 2,296,007 | Weisenberger | Sept. 15, 1942 |
| 2,687,818 | Williams | Aug. 31, 1954 |
| 2,957,608 | Wahl | Oct. 25, 1960 |